(12) United States Patent
Young

(10) Patent No.: US 7,077,366 B2
(45) Date of Patent: Jul. 18, 2006

(54) CAMERA STAND

(76) Inventor: William Young, 1991 Pierce Dairy Rd., Madison, GA (US) 30650

( * ) Notice: Subject to any disclaimer, the term of this patent is extended or adjusted under 35 U.S.C. 154(b) by 0 days.

(21) Appl. No.: 10/815,552

(22) Filed: Apr. 1, 2004

(65) Prior Publication Data

US 2005/0051683 A1   Mar. 10, 2005

Related U.S. Application Data

(60) Provisional application No. 60/460,135, filed on Apr. 3, 2003.

(51) Int. Cl.
*A45F 3/44* (2006.01)
(52) U.S. Cl. .................... 248/156; 248/558
(58) Field of Classification Search .............. 248/530, 248/533, 522, 519, 529, 187.1, 460, 461, 248/463, 528, 532, 165, 166, 156, 545, 558; 40/607.01, 607.04, 607.05, 607.06, 610
See application file for complete search history.

(56) References Cited

U.S. PATENT DOCUMENTS

| | | | |
|---|---|---|---|
| 2,720,249 A * | 10/1955 | Peterson | 108/141 |
| 2,877,828 A * | 3/1959 | Barnette, Jr. | 248/533 |
| 3,720,963 A * | 3/1973 | Zakaski | 4/628 |
| 4,497,077 A * | 2/1985 | Provost | 4/628 |
| 4,896,651 A * | 1/1990 | Kott, Jr. | 126/30 |
| 4,907,778 A * | 3/1990 | Rockwell | 248/676 |
| 5,161,561 A * | 11/1992 | Jamieson | 135/16 |
| 5,417,166 A * | 5/1995 | Credle, Sr. | 108/50.12 |
| 5,510,863 A * | 4/1996 | Kliewer | 396/428 |
| 5,567,907 A * | 10/1996 | Westfall | 102/344 |
| 6,286,796 B1 * | 9/2001 | Pugliesi | 248/187.1 |
| 6,487,977 B1 * | 12/2002 | Williams et al. | 108/50.12 |
| 6,705,240 B1 * | 3/2004 | Block et al. | 108/150 |

* cited by examiner

*Primary Examiner*—A. Joseph Wujciak, III
(74) *Attorney, Agent, or Firm*—Gardner Groff Santos & Greenwald PC

(57) ABSTRACT

An upper section having a platform for supporting a camera, a lower section having an anchor for mounting into the ground, and an adjustment mechanism for vertically and rotationally adjusting the upper section to selectively aim the camera. In an exemplary embodiment, the adjustment mechanism includes an upper shaft of the upper section and a lower shaft of the lower section being telescopically arranged. For compact storage, the lower section can be inverted and the lower shaft inserted into the upper shaft through an opening in the platform.

19 Claims, 3 Drawing Sheets

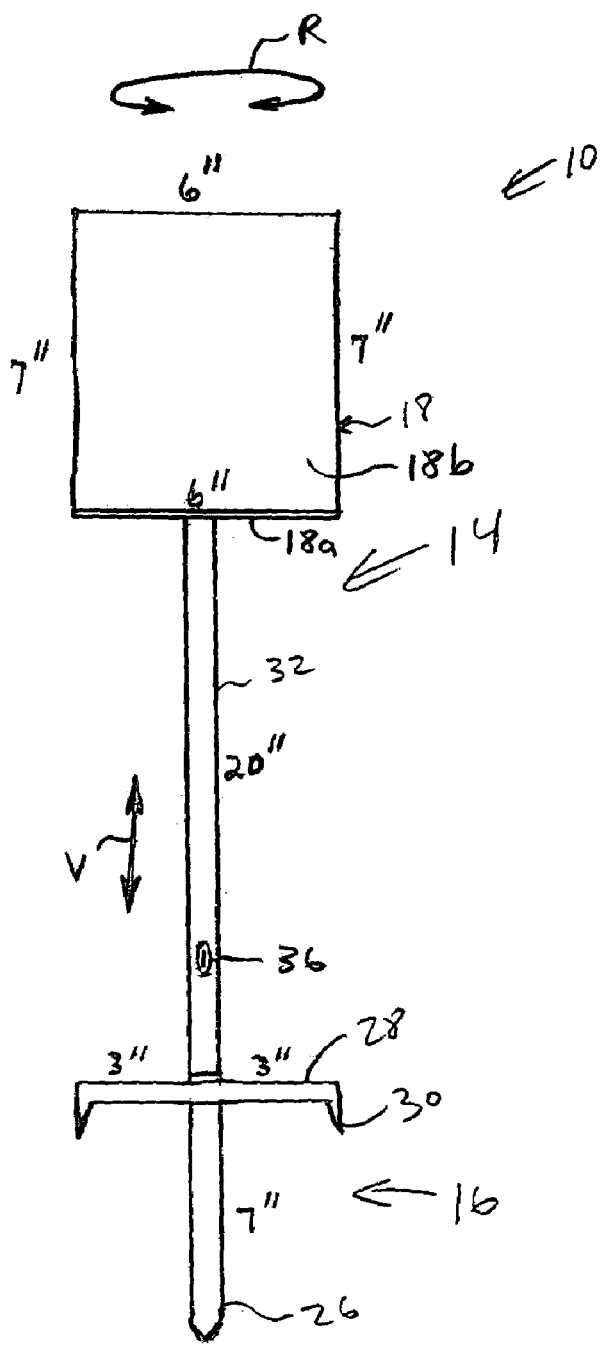
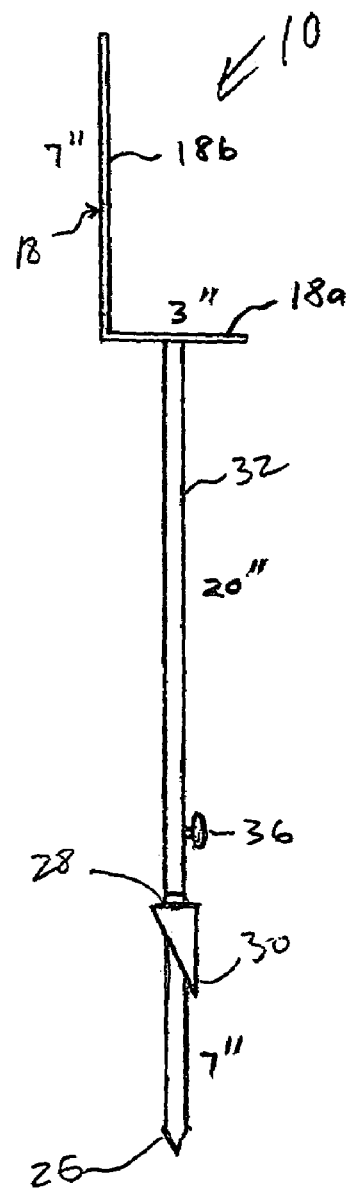
FIG. 1
FIG. 2

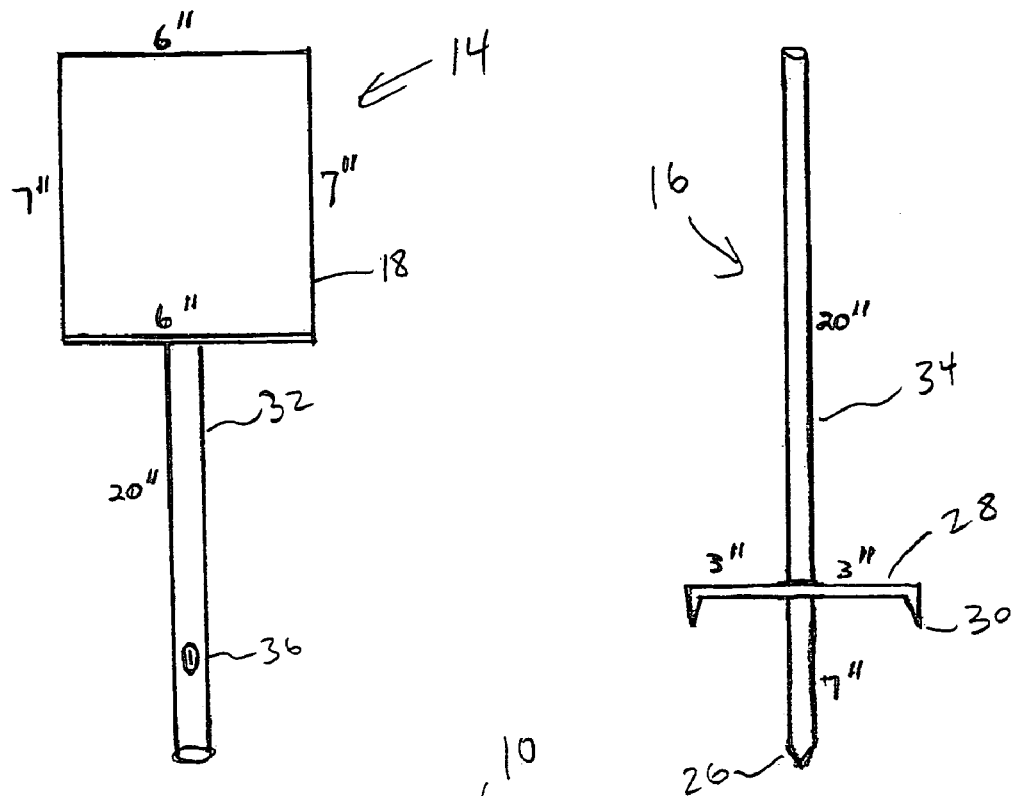
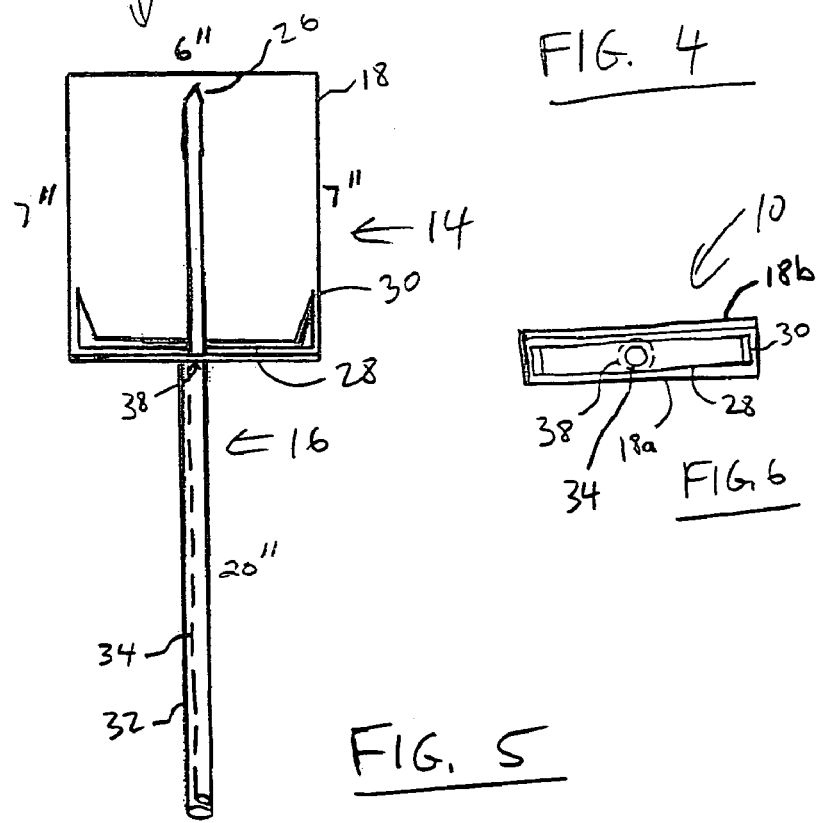
FIG. 3
FIG. 4
FIG. 5
FIG. 6

CAMERA STAND

CROSS-REFERENCE TO RELATED APPLICATION

This application claims the priority benefit of U.S. Provisional Patent Application Ser. No. 60/460,135 filed Apr. 3, 2003, the entire scope and content of which is hereby incorporated herein by reference.

TECHNICAL FIELD

The present invention relates generally to camera accessory equipment and, in particular, to a camera stand for wildlife photography.

BACKGROUND OF THE INVENTION

Photographers taking pictures of wildlife often use specialized cameras having motion sensors. These wildlife cameras can be set up for automated operation so that they detect the movement of an approaching animal and take its picture. In addition, wildlife cameras typically have nighttime (e.g., infrared) capabilities so that they can take good pictures at night. Using these cameras, a wildlife photographer can set up the camera in a location where there is a good likelihood of animal activity, and then leave to area for the safety of the photographer and/or so that the animals are not scared away by the presence of a human. In this way, wildlife photographers can obtain real-life photographs of animals, including dangerous, timid, and/or nocturnal animals, in their natural settings.

When taking photographs of wildlife, it is usually preferable to position the camera at some level above the ground. But when using a wildlife camera to take automated pictures, the photographer is not present to hold the camera. So many conventional wildlife cameras are designed for attaching to a tree, which provides for elevated camera positioning. However, there are many different shapes and sizes of trees, and they do not necessarily grow in the locations where animals are active. So trees are often not located in places that are well suited for the best photo opportunities. When they are, the trees may not be the right size or at the right angle to hang the camera. And in many places there are no trees at all, such as open fields, creeks, roads, etc.

There are many conventional "tripod" style camera stands available that support cameras for picture taking. Tripods are designed primarily for providing a stable platform for the camera so that it doesn't move during or between portraits or other shots. However, known tripods are not designed for rugged outdoor use on earthen or other uneven terrain. As such, conventional tripods have not proven satisfactory for widespread use in wildlife photography.

Accordingly, there is needed a way to position and set up wildlife cameras for automated operation where there are no trees, or no suitable trees, for mounting the camera. It is to the provision of an apparatus for providing such wildlife camera positioning capability that the present invention is primarily directed.

SUMMARY OF THE INVENTION

Generally described, the present invention provides a stand for a camera including an upper section having a platform for the camera, a lower section having an anchor for mounting in the ground, and an adjustment mechanism for vertically and rotationally moving the platform relative to the anchor to selectively aim the camera. In this way, the stand can be set up where the animals are, and not just where the trees are, and then adjusted precisely for getting more and better photographs.

In one aspect of the invention, the upper section includes an upper shaft extending downward from the platform, the lower section includes a lower shaft extending upward from the anchor, and the adjustment mechanism includes a vertical and rotational adjustment coupling between the upper shaft and the lower shaft. Preferably, the upper shaft and the lower shaft are telescopically arranged to provide this vertical and rotational adjustment.

In addition, the stand preferably includes a securing mechanism for securing the upper section and the lower section in place, and a camera mounting mechanism for securing the camera to the platform. The securing mechanism may include a set screw that extends through the upper section and engages the lower section. And the camera mounting mechanism may include at least one strap that attaches directly to indirectly to the platform in various positions that may be selected for the particular camera being used and the shot to be taken.

In another aspect of the invention, the platform includes an opening that can receive the lower shaft for storage and shipment when the lower section is disassembled and inverted. Preferably, the upper shaft is hollow and the platform opening is aligned with the hollow upper shaft. In this way, the lower shaft can be inserted through the opening and into the hollow upper shaft. Most preferably, the platform includes a horizontal support section and a vertical back section extending therefrom, the lower section includes at least one foot assist member attached to the lower shaft, and the flowing pairs of components have substantially the same dimensions: the upper shaft length and the lower shaft length above the foot assists; the platform back section height and the lower shaft length below the foot assists; the platform support section width and the foot assist member length; and the platform support section depth and the foot assist member width. In this way, the stand can be arranged in an extremely compact configuration for storage and shipment, with about the same dimensions as the upper section alone.

The present invention further provides a method of compactly arranging a camera stand for storage and shipment. The method includes providing the camera stand with a lower section having a lower shaft and an upper section having an upper shaft and a camera platform defining an opening; orienting the lower section in an upright position; orienting the upper section in an inverted position; and inserting the lower shaft through the opening in the platform. Preferably, the upper shaft is hollow and aligned with the platform opening, and the method further includes the step of inserting the lower shaft through the opening and into the hollow lower shaft.

Accordingly, the present invention includes a stand for a camera that can be set up most anywhere the wildlife photographer expects animal activity, regardless of whether or not there is a tree nearby suitable for mounting the camera. In addition, the camera stand can be easily adjusted for positioning the camera at just the right elevation and angle. Furthermore, the camera stand is easy to set up for use and break down for transporting, and it breaks down into a compact portable arrangement.

The specific techniques and structures employed by the invention to improve over the drawbacks of the prior devices and accomplish the advantages described herein will become apparent from the following detailed description of the exemplary embodiments of the invention and the appended drawings and claims.

BRIEF DESCRIPTION OF THE DRAWINGS

FIG. 1 is a front elevation view of a camera stand according to an exemplary embodiment of the present invention, showing an upper section and a lower section.

FIG. 2 is a left elevation view of the camera stand of FIG. 1.

FIG. 3 is a front view of the upper section of the camera stand of FIG. 1.

FIG. 4 is a front view of the lower section of the camera stand of FIG. 1.

FIG. 5 is a front view of the camera stand of FIG. 1 disassembled for storage and transporting, showing the lower section inverted and received in the upper section in a compact arrangement.

FIG. 6 is a plan view of the disassembled camera stand of FIG. 5.

DETAILED DESCRIPTION OF EXEMPLARY EMBODIMENTS

Figure 7:
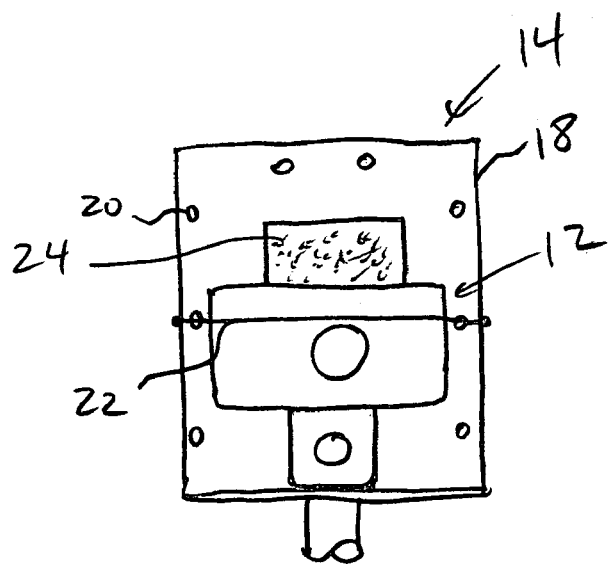
FIG. 7 is a front elevation view of a portion of the upper section of the camera stand of FIG. 1 in use with a small camera.
Figure 8:
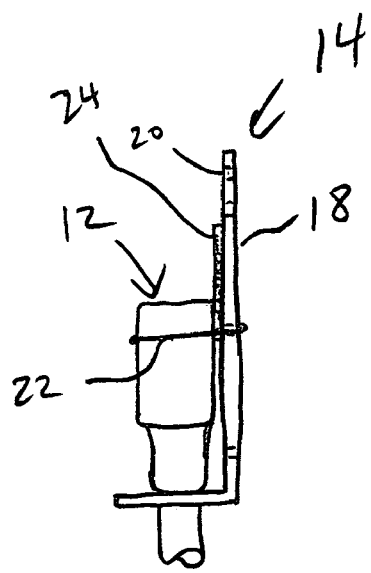
FIG. 8 is a right elevation view of the upper section portion of the camera stand and the camera of FIG. 7.
Figure 9:
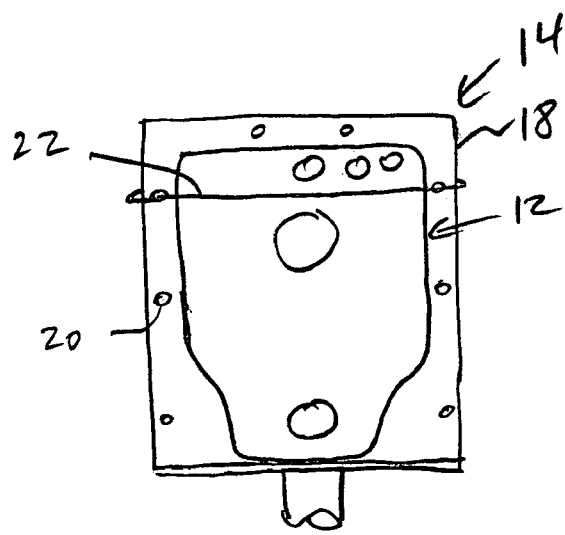
FIG. 9 is a front elevation view of a portion of the upper section of the camera stand of FIG. 1 in use with a large camera.
Figure 10:
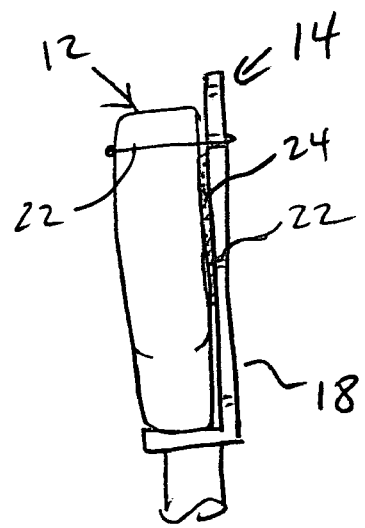
FIG. 10 is a right elevation view of the upper section portion of the camera stand and the camera of FIG. 9.

Referring to the drawing figures, FIGS. 1–10 illustrate a camera stand 10 according to an exemplary embodiment of the present invention. The stand 10 is designed for use with wildlife cameras 12. It will be understood, however, that the stand 10 can be used with other types of cameras, as may be desired.

The stand 10 comprises an upper section 14 and a lower section 16. The upper section has a platform 18 for removably supporting the camera 12 and an upper shaft 32 to which the platform is mounted. The platform 18 and the upper shaft 32 may be rigidly mounted together, for example by welding or bolted-on L-brackets. Alternatively, they may be adjustably mounted together, for example by a ball joint or other adjustable coupling permitting adjustment rotationally and angularly (relative to horizontal). In the depicted embodiment, the platform 18 is provided by a sheet of material having a support section 18a and a back section 18b extending at angle from the support section. For example, the support section 18a may be horizontal and the back section 18b may be vertical, extending at a 90 degree angle from the support section, as shown. The support section 18a supports the weight of the camera 12 and the back section 18b provides for mounting the camera in place.

In an alternative embodiment, the platform includes a lower front section extending upward from the front of the support section, the front section being short enough that it does not interfere with the camera lens but high enough that it helps keep the camera in place. In another alternative embodiment, the platform includes a top section extending forward from the top of the back section and a short upper front section extending downward from the front of the top section, and the back section includes a vertical adjustment mechanism, for example overlapping plates connected by a slidable track, so that the top section can be selectively raised or lowered down onto the camera to help secure it in place. In yet another alternative embodiment, the platform is a socket or another male or female coupling for use with a camera fitted with a mating coupling for attachment thereto. And in still another alternative embodiment, the platform is a plate that attaches to the bottom of the camera and includes a pin that is received in the upper section for holding the plate in place. It will be understood that many other types of platforms for supporting the camera may be included in the camera stand of the present invention.

To mount the camera 12 in place, the platform 18 includes a camera mounting mechanism. In the depicted embodiment, for example, the camera mounting mechanism includes a plurality of holes 20 along the left and right edges of the platform back section 18b, the holes arranged for being selectively connected to by one or more straps 22. The straps 22 are preferably provided by elastic members with hooks on the ends (i.e., bungee cords), the hooks receivable in the holes 20. The straps 22 can be stretched between different holes 20 depending on the size and shape of the particular camera 12. In this way, the stand 10 can be used with many different types and makes of cameras, including smaller cameras (see FIGS. 7 and 8) and larger cameras (see FIGS. 9 and 10). In addition, the camera mounting mechanism preferably further includes hook-and-loop fasteners (e.g., VELCRO) 24 attached to the platform back section 18b for mating with similar fasteners attached to the camera 12, thereby increasing the flexibility of the stand 10 for use with many different camera types.

In an alternative embodiment, the straps are provided by rope, nylon webbing, wire, or another type of strap, with or without a buckle or other mechanism for adjusting the length of the strap, either as a removable component or fixedly attached to the platform, and directly coupled to the platform or indirectly coupled thereto by using repositionable clamps or clips, sliding tabs, pivotal arms, or other movable structures. In another alternative embodiment, the camera mounting mechanism includes clamps or clips that can be removably attached to the edges of the platform back section in a position selected depending on the size of the camera, the clamps or clips including openings for attaching the straps indirectly to the platform using the clamps or clips. In yet another alternative embodiment, the camera mounting mechanism is provided by the platform back section including two vertical tracks in which ride two vertically slidable tabs each securable in a plurality of positions and each having a opening for attaching the straps indirectly to the platform using the tabs in the track. And in still other embodiments, the camera mounting mechanism includes straps that are retractable and wound on reels mounted to the platform, pivotal arms that swing out from the platform to engage the camera, an inverted U-shaped bar mounted to the front of the platform that can be selectively extended upward, or a combination of these for helping to support the camera in place.

Turning now to the lower section 16, it includes a lower shaft 34 and is adapted for mounting to most any terrain. In the depicted embodiment, the lower section 16 has an anchor 26 that can be stuck into the ground to support the stand 10 in an upright position. For example, the anchor 26 may include a pointed tip, an auger, and/or another structure for anchoring into the ground. Alternatively, the anchor may be provided by a tripod, another arrangement of feet, a plate, or another structure for supporting the upper section. In addition, the lower section 16 preferably includes foot assists 28, for example provided by a horizontal member such as a channel, bar, rod, etc. that is welded, bolted, or otherwise attached to the lower shaft 34. The foot assists 28 provide a location for the user to stand to use his weight to make it easier to install the stand 10 in firm ground, and they provide stability once the stand is set up. Furthermore, the foot assists 28 preferably include side anchors 30 extending downwardly from the foot assist member, which anchor into the ground for providing even more stability.

In order to selectively aim the camera 12, the stand 10 has an adjustment mechanism that permits the platform 18 to be adjustably movable with respect to the lower section 16 in both the vertical direction V and the rotational direction R. In the depicted embodiment, for example, the upper shaft 32 and the lower shaft 34 are telescopically arranged for vertical and rotational adjustment. That is, the lower shaft 34 telescopically slides into and rotates within the upper shaft 32, or vice versa. In addition, the adjustment mechanism preferably includes a securing mechanism 36 to secure the shafts 32 and 34 together in place in the selected vertical and rotational position. The securing mechanism 36 is preferably provided by a set screw (i.e., an eyebolt, wing nut, or knob with a threaded bolt) that can be inserted through a matingly threaded hole in the upper shaft 32 and tightened against the lower shaft, or vice versa.

In an alternative embodiment, the adjustment mechanism includes a master hole in the upper shaft and a series of adjustment holes in the lower shaft, or vice versa, with the adjustment holes being selectively alignable with the master hole for receiving a pin, bolt, or other elongate member therethrough. In another alternative embodiment, the adjustment mechanism includes a push button on the lower shaft that is selectively receivable in any of a series of adjustment holes in the upper shaft, or vice versa. In yet another alternative embodiment, the adjustment mechanism includes a tab or pin extending from the lower shaft that is selectively receivable in any of a series of adjustment notches laterally formed in a vertical slot in the upper shaft, or vice versa. In still another alternative embodiment, the upper and lower shafts are non-telescopic, overlapping channels or bars arranged side-by-side and slidingly connected together by a track, with or without the shafts being sectionalized and hinged together for folding for compact storage and unfolding and locking for use. In another alternative embodiment, the upper and lower shafts are matingly threaded with inner threads on one of the shafts and mating outer threads on the other one of the shafts, so that spinning the upper section provides vertical and rotational adjustment. In yet another embodiment, the securing mechanism includes a knob for ease of manual adjustment, a pin, a lever, a spring-biased mechanism, or a combination of these. And in still another embodiment, the stand includes a cover that can be selectively extended from the platform to cover the camera for protection from weather, sunlight, etc., and/or to assist in holding the camera in place.

The vertical and rotational adjustment mechanism permits the stand 10 to be set up and adjusted with the camera 12 at the perfect height, perfect angle, perfect distance, and at the perfect location, almost anywhere the photographer wants to take wildlife photographs. And the vertical adjusting feature allows setting the camera height for different species of wildlife. For example, low for turkeys, medium height for deer, and high for elk.

In a typical commercial embodiment, the platform is a piece of flat metal or plastic, with the back section 18b being 7 inches high and 6 inches wide, and the support section 18a being 3 inches deep and 6 inches wide. The upper shaft 32 is a 20 inch length of ¾ inch hollow metal or plastic tube, and the platform 18 is mounted to the top of the upper shaft. The lower shaft 34 is a 27 inch length of ½ inch solid metal rod, with 20 inches above the foot assists 28 (the same dimension as the length of the upper shaft 32) and 7 inches below them (the same dimension as the height of the platform back section 18b) for penetration into the ground. The foot assists 28 are provided by a 6 inch long, 3 inch wide piece of metal channel (the same dimensions as the width and depth of the platform support section 18a), with 3 inches on each side of the lower shaft. The securing mechanism 36 is provided by a ¼ inch set screw that mates with same-sized threading in hole in the upper shaft 32. In this embodiment, the overall length of the stand 10 can be adjusted from 34 to 53 inches high, with the platform support section 18a being positioned between 20 and 39 inches above ground level.

The stand 10 has an advantageous feature that permits disassembling the stand and arranging it compactly for storage and transporting it. In part, this is permitted because of an opening 38 in the support section 18a of the platform 18 that is aligned with the upper shaft 32 and similarly sized and shaped. To arrange the stand 10 in a compact space, the lower section 16 is inverted relative to the upper section 14, and the lower shaft 34 inserted through the opening 38 in the support section 18a of the platform 18 and into the upper shaft 32 (see FIGS. 5 and 6). As can be seen in the typical commercial embodiment described above, the following pairs of components preferably have the same dimensions: the upper shaft length and the lower shaft length above the foot assists, the platform back section height and the lower shaft length below the foot assists, the platform support section width and the foot assist member length, and the platform support section depth and the foot assist member width. In this way, the overall dimensions of the stand 10 in this compact arrangement are about the same as that of the upper section 14, and the tips of the anchor 26 and side anchors 30 are somewhat shrouded for safety.

In an alternative embodiment, the opening is a notch in the front edge of the support section 18b that is sized and shaped to receive the lower shaft. The notch preferably extends all the way through the support section to the back section and is positioned off-center so it does not interfere with the upper shaft.

To assemble the stand 10 for use, the lower shaft 34 is removed from the upper shaft 32, the lower section is turned to upright, and the lower shaft 34 is driven into the ground up to the foot assists 28. Next, the upper shaft 32 is telescopically slid down onto the lower shaft 34 and positioned vertically and rotationally with the platform 18 at the desired height and angle. Then the set screw 36 is tightened to secure the upper section 14 in place on the lower section 16. Finally, the camera 12 is mounted to the platform 18, and further vertical and rotational adjustments are made, as desired. To disassemble the stand 10, the process is reversed, and then the stand is packed into the compact arrangement described above.

Accordingly, the present invention includes a camera stand that can be set up at a preferred spot, independently of the availability of suitable trees for mounting the camera, and adjusted for precisely the aiming the camera for talking better wildlife photographs. In addition, the camera stand can be quickly and easily assembled and disassembled into a compact arrangement for storage and transporting.

It is to be understood that this invention is not limited to the specific devices, methods, conditions, and/or parameters described and/or shown herein, and that the terminology used herein is for the purpose of describing particular embodiments by way of example only. Thus, the terminology is intended to be broadly construed and is not intended to be limiting of the claimed invention. In addition, as used in the specification including the appended claims, the singular forms "a," "an," and "the" include the plural, plural forms include the singular, and reference to a particular numerical value includes at least that particular value, unless the context clearly dictates otherwise. Furthermore, any methods described herein are not intended to be limited to the sequence of steps described but can be carried out in other sequences, unless expressly stated otherwise herein.

Moreover, while certain embodiments are described above with particularity, these should not be construed as limitations on the scope of the invention. It should be understood, therefore, that the foregoing relates only to exemplary embodiments of the present invention, and that numerous changes may be made therein without departing from the spirit and scope of the invention as defined by the following claims.

What is claimed is:

1. A stand for use with different-sized cameras, comprising:
   an upper section including a platform adapted to support the cameras and a camera mounting mechanism adapted to secure the cameras to the platform, wherein the camera mounting mechanism includes a plurality of openings defined by the platform and at least one strap selectively positionable between selected ones of the openings to secure the cameras to the platform in selected positions, wherein an opening-to-strap ratio is greater than two-to-one so that at least one of the openings is unoccupied by the at least one strap when then stand is in use, wherein a first-sized one of the cameras is positionable with the at least one strap positioned between a first and a second one of the openings and a second-sized one of the cameras is positionable with the at least one strap positioned between a third and a fourth one of the openings;
   a lower section including an anchor adapted to support the upper section in an upright position; and
   an adjustment mechanism for vertically and rotationally moving the platform relative to the anchor to selectively aim the cameras,
   wherein the upper section includes an upper shaft extending downward from the plaftorm,
   the lower section includes a lower shaft extending upward from the anchor, and
   the platform defines an opening that receives the lower shaft when the lower section is detached from and inverted relative to the upper section, wherein the stand can be arranged in a compact configuration for storage and shipment.

2. The camera stand of claim 1, wherein:
   the adjustment mechanism includes a vertical adjustment coupling between the upper shaft and the lower shaft.

3. The camera stand of claim 2, wherein the upper shaft and the lower shaft are telescopically arranged to form the vertical adjustment coupling of the adjustment mechanism.

4. The camera stand of claim 1, wherein:
   the adjustment mechanism includes a rotational adjustment coupling between the upper shaft and the lower shaft.

5. The camera stand of claim 4, wherein the upper shaft and the lower shaft are telescopically arranged to form the rotational adjustment coupling of the adjustment mechanism.

6. The camera stand of claim 1, wherein:
   the upper shaft is hollow; and
   the platform opening is aligned with the hollow upper shaft, wherein the lower shaft is receivable in the hollow upper shaft when the lower section is detached from and inverted relative to the upper section.

7. The camera stand of claim 6, wherein:
   in a use position the stand is configured with the anchor in the ground and the lower shaft extending upward, and with the hollow upper shaft telescopically slid down at least partially over the lower shaft and the camera platform elevated from the ground, wherein the upper and lower shafts are between the platform and the anchor; and
   in a stored position the stand is compactly configured with the anchor removed from the ground, the hollow upper shaft slid off of the lower shaft and then inverted, and the lower shaft inserted through the shaft opening in the platform and telescopically inserted at least partially into the hollow upper shaft, wherein the platform and the anchor are adjacent each other with the upper and lower shafts not positioned therebetween.

8. The camera stand of claim 1, wherein the platform includes a horizontal support section and a vertical back section extending therefrom, the lower section includes at least one foot assist member attached to the lower shaft, and wherein:
   the upper shaft has a length that is substantially the same as a length of the lower shaft above the foot assists;
   the platform back section has a height that is substantially the same as a length of the lower shaft below the foot assists;
   the platform support section has a width that is substantially the same as a length of the foot assist member; and
   the platform support section has a depth that is substantially the same as a width of the foot assist member.

9. The camera stand of claim 1, where the anchor is adapted for inserting into ground.

10. The camera stand of claim 1, wherein the lower section includes two or more foot assists for ease of installation, and at least two side anchors extending downward from the foot assists for inserting into ground for increased stability.

11. The camera stand of claim 1, wherein the platform includes a generally horizontal camera-supporting section and a generally vertical back section extending therefrom, the camera-supporting and back sections having a generally L-shaped profile, and the back section defining the openings, wherein the cameras are weight-supported on the generally horizontal section and secured to the generally vertical section by the camera mounting mechanism, and wherein the at least one strap when positioned between the first and second openings is vertically offset from when positioned between the third and fourth openings.

12. A stand for a camera, comprising:
   an upper section including a platform adapted to support the camera, a camera mounting mechanism adapted to secure the camera to the platform, and a hollow upper shaft extending downward from the platform, the platform defining a shaft opening that is aligned with the hollow upper shaft;
   a lower section including an anchor adapted to insert into ground and support the upper section in an upright position, and a lower shaft extending upward from the anchor, the lower shaft telescopically receivable within the hollow upper shaft and through the platform opening;

wherein in a use position the stand is configured with the anchor in the ground and the lower shaft extending upward, and with the hollow upper shaft telescopically slid down at least partially over the lower shaft and the camera platform elevated from the ground, wherein the upper and lower shafts are between the platform and the anchor; and wherein in a storage position the stand is compactly configured with the anchor removed from the ground, the hollow upper shaft slid off of the lower shaft and then inverted, and the lower shaft inserted through the shaft opening in the platform and telescopically inserted at least partially into the hollow upper shaft, wherein the platform and the anchor are adjacent each other with the upper and lower shafts not positioned therebetween.

13. The camera stand of claim 12, wherein the camera mounting mechanism comprises at least one strap and at least two vertical series of holes formed in the platform for receiving the strap for selectively positioning and attaching the strap to the platform.

14. The camera stand of claim 12, wherein the lower section includes two or more foot assist members for ease of installation, and at least two side anchors extending downward from the foot assist members for inserting into ground for increased stability.

15. The camera stand of claim 14, wherein the platform includes a horizontal support section and a vertical back section extending therefrom, and wherein:

the upper shaft has a length that is substantially the same as a length of the lower shaft above the foot assist member;

the platform back section has a height that is substantially the same as a length of the anchor below the foot assist member;

the platform support section has a width that is substantially the same as a length of the foot assist member; and the platform support section has a depth that is substantially the same as a width of the foot assist member, wherein when the stand is configured in the storage position with the platform and the anchor adjacent each other, the anchor and the foot assist member do not extend out of a three dimensional box defined by the horizontal support section and the vertical back section of the platform.

16. The camera stand of claim 12, wherein the telescopic arrangement of the upper shaft and the lower shaft permits the platform to be vertically and rotationally moved relative to the anchor to selectively aim the camera, and further comprising a securing mechanism adapted to secure the upper section and the lower section in place.

17. The camera stand of claim 16, wherein the securing mechanism comprises a set screw extendable through the upper section and engagable with the lower section.

18. A method of compactly rearranging a camera stand from a use position to a storage position, comprising;

providing the camera stand with a lower section having a lower shaft and an anchor and with an upper section having an upper shaft and a camera platform defining a shaft opening, wherein in the use position the stand is configured with the anchor in the ground and the lower shaft extending upward, and with the upper shaft coupled to the lower shaft and the camera platform elevated from the ground, wherein the upper and lower shafts are between the platform and the anchor;

removing the anchor from the ground;

separating the upper shaft from the lower shaft;

inverting the lower shaft; and inserting the inverted lower shaft through the shaft opening in the platform until the platform and the anchor are adjacent each other and the upper and lower shafts are not positioned therebetween.

19. The method of claim 18, further comprising:

providing the upper shaft as a hollow upper shaft with the platform opening aligned with the hollow upper shaft; and telescopically inserting the lower shaft into the hollow upper shaft after inserting the lower shaft through the platform shaft opening.

* * * * *